United States Patent Office 3,745,119
Patented July 10, 1973

3,745,119
PRODUCTION OF HIGH PURITY MOLYBDENUM USING SILVER COATED CARBON AS ADSORBENT
Hirofumi Arino, New Windsor, and Paul Mylett Madigan, Greenwood Lake, N.Y., assignors to Union Carbide Corporation, New York, N.Y.
No Drawing. Filed Aug. 17, 1970, Ser. No. 64,567
Int. Cl. C22b 59/100
U.S. Cl. 252—301.1 R                            24 Claims

ABSTRACT OF THE DISCLOSURE

High purity molybdenum, particularly radioactive molybdenum-99, is separated from acidic solution containing dissolved molybdenum along with other materials by contacting the liquid with activated carbon having a coating of silver to adsorb the molybdenum on said carbon. The molybdenum can be recovered from said carbon by eluting with an alkaline solution. The invention is useful for recovering high purity radioactive molybdenum-99 that is used to produce radiopharmaceutical generators.

---

The invention relates to the recovery of molybdenum, and in particular, to the recovery of radioactive molybdenum-99 from liquids containing dissolved molybdenum.

Molybdenum-99 is widely used in nuclear medicine because it produces a daughter product, technetium-99m, which is used as a diagnostic tracer in in vivo diagnostic tests, for example, in brain tumor, liver, kidney, lung, and thyroid scans. For use in such radiopharmaceutical generators, molybdenum-99 ($^{99}$Mo) must be of exceptionally high order of purity, and it should have a relatively high specific activity. One of the ways that has been studied for producing $^{99}$Mo has been by irradiating uranium in a nuclear reactor. However, one of the problems that is encountered when producing $^{99}$Mo in this manner is that more than 50 elements and more than 100 radioactive isotopes are formed by nuclear fission. Therefore, the recovery of any single radioactive species from such a mixture can be a formidable task. Methods that have been employed heretofore for recovering $^{99}$Mo from irradiated uranium include alumina column chromatography. However, the yield of product is small by this method, and the $^{99}$Mo prepared is not sufficiently pure for medical use because it contains significant amounts of radioactive iodine and ruthenium. Another method that has been attempted for recovering $^{99}$Mo involves extracting the molybdenum from acidic aqueous solution into an organic solvent containing di-2-ethylhexyl phosphoric acid. However, this method required repeated extraction and back-extraction procedures, resulting in a relatively large quantity of liquid radioactive waste that had to be disposed of.

The present invention is based upon the discovery of a method for recovering molybdenum from a liquid containing dissolved molybdenum along with many other materials.

Accordingly, it is an object of this invention to provide a process for separating molybdenum from liquids containing dissolved molybdenum.

It is another object of this invention to provide a process for recovering molybdenum, and particularly molybdenum-99, from liquids containing molybdenum.

It is a further object of this invention to provide a process for recovering molybdenum-99 from mixtures of elements such as the mixtures that are obtained upon the irradiation of uranium.

A still further object of the invention is to provide a method for recovering molybdenum from acidic solution by contacting such solution with activated carbon having a coating of silver deposited therein, to adsorb molybdenum in said carbon, followed by eluting the adsorbed molybdenum with an alkaline solution.

Additional objects of this invention will be apparent from reading the accompanying description.

The foregoing and other object of the invention are attained by a process which comprises contacting an acidic liquid containing dissolved molybdenum with activated carbon having a silver coating, to thereby adsorb the molybdenum on said carbon. Thereafter, the molybdenum can be recovered from the carbon by eluting with an alkaline solution.

The material that is used as an adsorbent for molybdenum in the process of the invention is activated carbon that contains silver deposited therein. The activated carbon that is employed is preferably employed as a powder, although other forms of activated carbon can be employed is desired. The powder preferably has a particle size of from about 5 to about 400 mesh, and more preferably from about 50 to about 200 mesh. (The mesh size of the carbon particles is measured in accordance with the U.S. Standard Sieve Series.)

Any type of activated carbon can be employed in the invention. The purification efficiency appears to be about the same for all types of activated carbon, although adsorption capacity appears to vary directly with the amount of oxygen contained in the carbon.

It has been found that the preferred type of activated carbon is that which is prepared from coconut shells by standard procedures.

The activated carbon can be coated with elemental silver by any standard procedure. For instance, the carbon can first be washed with pure water in order to eliminate all impurities, and it can then be contacted with an aqueous solution of silver nitrate, which can contain dilute acid such as nitric acid or sulfuric acid in order to prevent the silver nitrate from precipitating. A reducing agent such as sodium sulfite is added, followed by the addition of sodium hydroxide. This mixture is heated at a temperature of from about 40° to about 100° C., and preferably from about 80° to about 90° C., for a period of about 30 minutes. After cooling, the excess liquid is removed by decanting, or the like, and the activated carbon containing the coating or deposit of silver therein is washed with purified water several times. The silver coated activated carbon should be stored under water until it is used in order to prevent contamination.

In depositing the silver in the carbon, the alkali is used to ensure that the maximum amount of silver is deposited, and the reducing agent is used to ensure that the silver deposited is in the elemental form, not in the form of the oxide or hydroxide.

The amount of silver deposited will normally be within the range of from about 0.01 to about 2, and preferably from about 0.1 to about 1.5, weight percent, based on weight of carbon.

The silver coated activated carbon can be used in a mixture with activated carbon (free of silver coating) as the adsorbent in the process of the invention. In many cases, the adsorption capacity is thereby increased. The proportion of activated carbon can be up to, for instance, about 70, and preferably from about 40 to 60, weight percent, based upon weight of silver coated carbon plus activated (non-silver coated) carbon.

The liquid that is employed in the process of the invention to be contacted with the silver coated activated carbon is an acidic liquid having a pH below about 5 containing dissolved molybdenum. The liquid will normally be an aqueous solution containing a mineral acid in a concentration of from about 0.001 to about 10 normal, and preferably from about 0.1 to about 3 normal. Organic acids can also be employed, so long as the pH is maintained below about 5.

The acidic aqueous liquid can be employed to dissolve the source of radioactive molybdenum. For instance, neutron irradiated uranium can be dissolved in the acid, and the resulting acidic solution can then be employed in the process of the invention to separate the molybdenum from the solution. Among the acids that can be employed in the invention are sulfuric acid, hydrochloric acid, nitric acid, sulfurous acid, and the like. Preferred acids include sulfuric acid and a mixture of sulfuric and sulfurous acid.

Molybdenum can be separated from the above-described acidic solution by contacting this solution with the silver deposited on carbon. The contacting can be carried out in any convenient manner such as by flowing the liquid through a column containing the silver/carbon adsorbent. Other means of contacting the adsorbent with the liquid can be employed, if desired. Such other means include adding the adsorbent to a vessel containing the liquid, and then separating the adsorbent from the liquid. However, the use of a column containing adsorbent is the preferred mode of carrying out this aspect of the invention.

It has been found that the temperature of the liquid is not a narrowly critical feature of the invention. For instance, while the liquid is being contacted with the adsorbent, it can vary from a temperature of from about 0 to about 100° C., and preferably from about 5 to about 30° C.

The contacting time of the acidic solution with the silver/carbon adsorbent will normally be at least about one minute. When carrying out the process of the invention in laboratory scale equipment (i.e., for the recovery of about 10 milligrams of molybdenum), a flow rate of about 0.1 to about 8 milliliters/square centimeter/minute has been found acceptable with a bed of adsorbent 4 to 10 centimeters high. It is anticipated that comparable flow rates would be appropriate for larger scale operation.

The molybdenum that is adsorbed on the silver coated activated carbon can be recovered from the adsorbent by eluting with an alkaline solution. For instance, the adsorbent containing the molybdenum can be contained in a column, and an alkaline solution is then flowed through the column to remove the molybdenum. The eluent that first comes out of the column will be acidic, but as soon as the pH of the eluent increases to neutral, the molybdenum begins to be desorbed. Substantially complete desorption of molybdenum is found if the alkaline solution has a pH greater than 8. The alkaline solution that is employed to elute the molybdenum can be an aqueous solution of sodium hydroxide, potassium hydroxide, ammonium hydroxide, sodium carbonate, or the like. The preferred material to be used as the eluting solution is an aqueous solution of sodium hydroxide having a concentration of from about 0.1 to about 1 normal.

The molybdenum can be recovered from the eluent by any conventional procedure.

A principal utility for the present invention is to prepare $^{99}$Mo generators for "milking" technetium-99m. The eluate from the process of the invention can be neutralized, and the molybdenum can then be loaded on alumina for use as a technetium-99m generator.

In order to obtain medicinal purity (i.e., a purity of the order of 99.999 percent $^{99}$Mo plus its daughter product $^{99}$Tc$^m$, the purity being with respect to radioactive species), it is usually required to make two passes through the silver-carbon column, as is more fully discussed below.

The silver-carbon absorbent can be regenerated by washing with acid.

The following examples illustrate certain aspects of the invention:

EXAMPLE 1.—PREPARATION OF SILVER-COATED CARBON ADSORBENT (A) Reagents (1) Charcoal: Fisher coconut charcoal (Cat. No. 5–690, 50–200 mesh) was obtained from the manufacturer—Barney Cheney, Cassady at Eighth, Columbus, Ohio 43219.

(2) AgNO$_3$ (10%): 10 grams of AgNO$_3$ crystal (Reagent Grade) was dissolved in 100 ml. of 0.1 N HNO$_3$.

(3) NaOH (1 M): 40 grams of NaOH crystal was dissolved in 1 liter of water.

(4) Na$_2$SO$_3$ (5%): 5 grams of Na$_2$SO$_3$ was dissolved in 100 ml. of water.

(5) HNO$_3$ (0.1 M): 6.3 cc. of HNO$_3$ was diluted to one liter.

(B) Procedure (1) Transfer 70 grams of coconut charcoal into a 500 cc. breaker.

(2) Wash charcoal with water and discard fines. Repeat washing 4 to 5 times.

(3) Place beaker on stirring-heater. Add magnet stirrer. Start stirring gently.

(4) Add 30 cc. of 10% AgNO$_3$ in 0.1 M HNO$_3$, 8 cc. of a 5% Na$_2$SO$_3$ and 80 cc. of 1 M NaOH, successively.

(5) Heat at 80–90° C. for 30 minutes. Cool.

(6) Discard supernate. Wash the adsorbent with water 4 to 5 times. Store the adsorbent (Ag-C) under water.

EXAMPLE 2.—ADSORPTION OF MOLYBDENUM-99

Capacity vs. Acid concentration

The adsorption capacity for molybdenum was measured for Ag-C, a 1:1 (weight) mixture of Ag-C and activated charcoal, and activated charcoal in the H$_2$SO$_4$ concentration range from 0.5 N to 6 N. The adsorbent (approximately 3.8 grams) was placed into a glass column (I.D. of 1 cm.) and washed with H$_2$SO$_4$ of the desired concentration. The sample solution consisted of 20 cc. of H$_2$SO$_4$ containing 20 mg. of non-radioactive molybdenum and tracer quantities of $^{99}$Mo. A sample solution was passed through the column at a flow rate of 1.5 ml./min.; and the column was then washed with 20 cc. of H$_2$SO$_4$ of the same concentration as the original sample solution. The adsorption of molybdenum was determined by measuring the activity of the $^{99}$Mo tracer in the eluate. The results indicate that the Ag-C/charcoal mixture had the highest capacity for molybdenum, and that the capacity of all of the systems decreased with increasing H$_2$SO$_4$ concentration. The data indicate that at concentrations below 1 N H$_2$SO$_4$ the adsorption capacity increases drastically. It is speculated that this may be due to the formation of higher molecular weight molybdenum polymers which are known to occur at lower acidic concentrations. The adsorption capacity of the mixture of Ag-C and charcoal (Ag-C/C) for molybdenum is about 20% higher than that of a plain Ag-C substrate.

The experiments also proved that the separation factor of Ag-C/C is essentially the same as Ag-C. All additional experiments to obtain a higher adsorption of molybdenum were made primarily using Ag-C/C substrate. The table below displays the results of this experiment:

TABLE I.—ADSORPTION OF MOLYBDENUM AT DIFFERENT H$_2$SO$_4$ CONCENTRATION

| Adsorbent | Concentration of H$_2$SO$_4$ in water (N) | Adsorption capacity, mgm. Mo/gram of dry adsorbent |
| --- | --- | --- |
| Ag-C | 0.5 | 1.8 |
| Ag-C | 1 | 1.3 |
| Ag-C | 2 | 0.7 |
| Ag-C/C | 0.5 | 2.0 |
| Ag-C/C | 1 | 1.8 |
| Ag-C/C | 2 | 1.3 |
| Ag-C/C | 3 | 1.0 |
| Ag-C/C | 6 | 0.2 |
| C | 0.5 | 1.6 |
| C | 1 | 1.2 |
| C | 2 | 0.9 |

EXAMPLE 3

Capacity vs. Solution composition

Using the identical technique described above, the adsorption of molybdenum was measured using various acidic solutions and both the 1:1 Ag-C/C and the Ag-C adsorbents. (See Table II.) These data indicate that the greatest adsorption was obtained in the presence of sulfuric acid and that the adsorption capacity for molybdenum in sulfuric acid is not significantly altered due to the presence of sulfite, nitrate, chloride, cupric and ferric ions.

TABLE II.—THE ADSORPTION OF Mo IN DIFFERENT SOLUTIONS ON Ag-C AND Ag-C/C ADSORBENTS

| Adsorbent | Sample solution | Adsorption capacity (mg. Mo/g.) |
|---|---|---|
| Ag-C | 2 N $H_2SO_4$ | 0.9–1.1 |
| Ag-C | 2 N $H_2SO_4$–0.1% $H_2SO_3$ | 0.9–1.1 |
| Ag-C | 2 N $H_2SO_4$–1% $CuSO_4$ | 0.9–1.1 |
| Ag-C/C | 2 N $H_2SO_4$ | 1.1–1.6 |
| Ag-C/C | 2 N HCl | 1.5 |
| Ag-C/C | 2 N $HNO_3$ | 0.8–1.1 |
| Ag-C/C | 2 N $H_2SO_4$–0.1% $H_2SO_3$ | 1.1–1.6 |
| Ag-C/C | 2 N $H_2SO_4$–1% $CuSO_4$ | 1.5 |
| Ag-C/C | 2 N $H_2SO_4$–2% $Fe_2(SO_4)_3$ | 1.5 |
| Ag-C/C | 2 N $H_2SO_4$–1% $HNO_3$ | 1.2 |

EXAMPLE 4

Effect of carbon particle size

The effect of particle size of the original carbon particles used to make the Ag-C system on the adsorption capacity of molybdenum was measured. The results of these measurements are shown in Table III. No significant difference on the adsorption capacity of molybdenum was observed for particle sizes in the range studied in this investigation. The procedure used was analogous to that described above.

TABLE III.—EFFECT OF PARTICLE SIZE

| Particle size, mesh: | Adsorption capacity, mg. Mo/g. |
|---|---|
| 50–60 | 1.1 |
| 50–100 | 0.95 |
| 50–200 | 1.1 |

EXAMPLE 5

Silver losses versus acidity

When an acidic solution passes through an Ag-C column, silver may undergo some chemical change and then be extracted in the alkaline eluant. Therefore, the concentrations of silver in NaOH eluates were determined when different concentrations of acid were used.

Ten mg. of Mo carrier and $^{99}$Mo tracer were adsorbed on a 2 x 8 cm. Ag-C column from 2.5 N and 1.0 N $H_2SO_4$ solution. After each column was washed with 80 ml. of water, Mo was eluated with 80 ml. of 0.2 N NaOH solution. The temperature of elution was kept at 80±10° C. The silver concentration was determined by atomic adsorption to be <0.1 p.p.m. at 2.5 N $H_2SO_4$ and <0.1 p.p.m. at 1.0 N $H_2SO_4$. There would not be any significant loss of silver in these acid concentrations.

EXAMPLE 6.—THE DESORPTION OF MOLYBDENUM-99

Effect of solution composition

Molybdenum will desorb from the Ag-C adsorption systems when eluted with a base. The percent recovery of molybdenum, however, is dependent on what type of base is used. Table IV shows the percent recovery of molybdenum using different eluants. These data were obtained by adsorbing 5 mg. of molybdenum on a 1 by 7 cm. column of the Ag-C/C system with a molybdenum-99 tracer. After adsorption of the molybdenum in 2 N $H_2SO_4$, the molybdenum recovered in 40 ml. of eluant was measured. Flow rates used in the desorption step were between 1 and 1.5 ml./min. Broadly, in laboratory scale operation, flow rates of from about 0.1–8 and preferably from about 0.5–2, cc./cm.$^2$/min., can be used. The temperature of the eluant can vary from about 0 to 100° C., and preferably from about 20 to about 90° C.

TABLE IV.—DESORPTION OF $^{99}$Mo BY DIFFERENT ELUATES

| Eluent | Concentration (N) | Recovery of $^{99}$Mo (percent) |
|---|---|---|
| NaOH | 0.2 | 97.0 |
| KOH | 0.2 | 84.6 |
| $NH_4OH$ | 0.2 | 87.8 |
| $Na_2CO_3$ | 0.2 | 81.7 |

EXAMPLE 7

Since it is highly desirable to obtain molybdenum in sodium hydroxide (because the eluate can later be neutralized with HCl and diluted to form physiological saline solution), a percent recovery of molybdenum was also measured for different sodium hydroxide concentrations, using both hot and cold elution. These data are presented in Table V. The adsorption data for sodium hydroxide indicate that the percent recovery of molybdenum is independent of temperature and concentration of the sodium hydroxide. One of the key points in elution efficiency is how much volume of a basic eluant is needed to bring the adsorption system to a neutral-to-higher pH. As soon as the adsorption system reaches a neutral pH, $^{99}$Mo starts to elute.

TABLE V.—DESORPTION OF $^{99}$Mo BY NaOH AT DIFFERENT CONCENTRATIONS AND TEMPERATURES

| Concentration (N) | Temperature (° C.) | $^{99}$Mo recovery (percent) |
|---|---|---|
| 0.1 | 20 | 91 |
| 0.2 | 20 | 96 |
| 0.2 | 70 | 98 |
| 0.3 | 20 | 97 |
| 0.5 | 20 | 98 |
| 0.5 | 70 | 98 |
| 1.0 | 20 | 97 |

EXAMPLE 8

Effect of radiation exposure and aging

When a radioactive solution passes through a chemical separation column, chemical reactions may take place due to radiation. Therefore, an Ag-C/C column and an Ag-C column were irradiated by gamma-rays and the $^{99}$Mo recovery was measured.

The $^{99}$Mo was adsorbed on the separation column (2 x 4 cm.) and both ends were sealed with rubber septa and aluminum crimps with a ventilation needle attached at one end. The samples were encapsulated in aluminum capsules and irradiated for different periods of time in a nuclear reactor with a total integrated radiation dose ranging from 20 to 250 megarads. The sample columns, when they were received, were fairly warm (50–60° C.). A red rubber septum was observed to lose its elasticity after irradiation, allowing air to flow through the hole punctured by a needle.

Table VI shows the recovery of $^{99}$Mo from the irradiated columns. The $^{99}$Mo was eluted with 60 cc. of 0.2 N NaOH. The data do not show a clear difference in the recovery of $^{99}$Mo between an irradiated sample and a non-irradiated sample. However, it can be seen from the data that there is an aging effect on the recovery of $^{99}$Mo. The recovery of $^{99}$Mo decreased when the separation column was allowed to stand overnight. However, the effect of aging, if it occurred, could be reduced to only several percent by using a heated eluant and keeping the elution system at a temperature of 60–80° C.

TABLE VI.—EFFECTS OF RADIATION AND AGING ON RECOVERY OF $^{99}$Mo

| Adsorbent | Integrated radiation dose (mr.) | $^{99}$Mo recovery (percent) | Time period from adsorption to elution (hr.) | Temperature of eluting system (° C.) |
|---|---|---|---|---|
| Ag-C/C | 0 | 95 | <6 | (¹) |
| Ag-C | 0 | 96 | <6 | (¹) |
| Ag-C/C | 0 | 62 | 24 | (¹) |
| Ag-C/C | 20 | 64 | 24 | (¹) |
| Ag-C/C | 0 | 87 | 24 | 60–80 |
| Ag-C/C | 20 | 87 | 24 | 60–80 |
| Ag-C | 40 | 86 | 24 | 60–80 |
| Ag-C | 40 | 87 | 24 | 60–80 |
| Ag-C/C | 250 | 88 | 24 | 60–80 |
| Ag-C | 250 | 87 | 24 | 60–80 |

¹ Room temperature.

EXAMPLE 9.—SEPARATION OF $^{99}$Mo FROM A FISSION PRODUCT SOLUTION

Separation efficiency and purity of fission product $^{99}$Mo

When uranium is irradiated in a nuclear reactor, more than 50 elements and more than 100 radioactive isotopes are formed by nuclear fission. The gamma-ray spectrum of the irradiated uranium does not show any peak for $^{99}$Mo because it is completely masked by other isotopes. The irradiated uranium is dissolved in sulfuric acid and sulfurous acid is added to the solution. The solution is passed through an Ag-C/C column and the column is washed with a small volume of water. $^{99}$Mo can be eluted with NaOH solution. The $^{99}$Mo fraction clearly shows the gamma-spectrum of $^{99}$Mo with small contamination by $^{132}$Te–$^{132}$I and $^{103}$Ru. If the solution is passed through a second small column containing Ag/C in the upper part and the Na form of zirconium oxide in the lower part of the column, >99.9% pure $^{99}$Mo is obtained. The chemical purity of the $^{99}$Mo solution is extremely good with a heavy metal content of about one part per million or less. The following discussion will describe the separation efficiency in each step.

(1) One column system.—5 g. of $UO_2$ (natural) was irradiated at $10^{13}$ neutron/cm.²/second for 15 minutes. This reactor irradiation condition formed about 1 millicurie of $^{99}$Mo. The irradiated uranium was dissolved in 50 cc. of 2 N $H_2SO_4$ and 5 cc. of 30% $H_2O_2$ with reflux. To the solution, 5 cc. of 6% $H_2SO_3$ was added. The addition of $H_2SO_3$ was necessary to remove $H_2O_2$ and to obtain a high separation efficiency for $^{132}$Te and $^{239}$Np. The sample solution was passed through a Ag-C/C column (1 x 7 cm.) and the column was washed with 50 cc. of water. $^{99}$Mo was eluted with 40 cc. of 0.2 N NaOH. In the gamma-ray spectrum of the eluant, $^{99}$Mo–$^{99}$Tc$^m$ peaks are clearly seen. However, some contaminations by $^{132}$Te–$^{132}$I and $^{103}$Ru are also observed.

(2) Two column system.—The above $^{99}$Mo eluate was passed through a second small column (1 x 8 cm.) containing Ag/C substrate in the upper half part and the Na form of zirconium oxide in the lower half part of the column. The gamma-ray spectrum of $^{99}$Mo fraction after passage through the second separation column does not contain any noticeable impurity.

In order to determine the purification efficiency of the Ag/C substrate contained in the second column, a separate Ag/C column was prepared. The $^{99}$Mo eluate from the first column was passed through the Ag-C column (1 x 4 cm.). The gamma-ray spectrum data show that Ag-C eliminates all of the $^{103}$Ru but leaves a small amount of $^{132}$Te. Thus, the function of the Na form of zirconium oxide is to remove the small amount of residual $^{132}$Te isotope and chemical contaminants such as heavy metal ions, in order to obtain $^{99}$Mo in medicinal purity (i.e., of the order of 99.999 percent).

Additional measurements were made using a Ge(Li) crystal to determine the purity of $^{99}$Mo solution. The gamma-ray spectra taken by the Ge(Li) crystal did not detect any radioisotopes other than $^{99}$Mo–$^{99}$Tc$^m$. The results are displayed in Table VII.

The chemical purity of the $^{99}$Mo fraction (0.2 N NaOH) was very high. The total heavy metal content was less than one part per million (p.p.m.). An example of emission spectroscopic analysis is as follows: Ag, 0.0 p.p.m.; Ca, 0.1 p.p.m.; Cu, 0.03 p.p.m.; Al, 0.0 p.p.m.; Fe, 0.0 p.p.m., etc.

TABLE VII.—IDENTIFICATION OF PHOTOELECTRIC PEAKS OF THE GAMMA-RAY SPECTRUM OF THE $^{99}$Mo PRODUCT SOLUTION USING A Ge(Li) CRYSTAL

| Gamma-ray (kev.) | Source | Relative amount |
|---|---|---|
| 144 | $^{99}$Mo–$^{99}$Tc | 30,000 |
| 184 | $^{99}$Mo | 800 |
| 281 | Probably coincidence sum of 144 | 3.2 |
| 369 | $^{99}$Mo | 128 |
| 741 | $^{99}$Mo | 517 |
| 779 | $^{99}$Mo | 144 |
| 824 | $^{99}$Mo | 1.8 |
| 881 | Sum of 741 and 144 | 1.4 |
| 922 | $^{99}$Mo sum of 779 and 144 | 1.1 |
| 963 | Sum of 779 and 184 | 1.0 |

Separation of $^{131}$I, $^{103}$Ru and $^{132}$Te from $^{99}$Mo

In the separation of fission product $^{99}$Mo, some radioisotopes such as iodine, ruthenium, and tellurium often present particular difficulty. For example, the Brookhaven method that is known to be most effective does not satisfactorily separate these isotopes. Below is a discussion of the separation efficiency of the Ag-C system for these isotopes.

(1) Separation of $^{131}$I.—The nuclear fission process produces several iodine radioisotopes. Among these, because of its half-like, $^{131}$I is the most significant for the separation of $^{99}$Mo.

In the Ag-C system, $^{131}$I is adsorbed on the Ag-C column and is not eluted with the eluant. The reason for the irreversible adsorption is due to the well-known chemical reaction: $Ag^+ + I^- \rightarrow AgI$. Silver iodide (AgI) is an insoluble salt with a solubility product of $10^{-13}$.

(2) Separation of $^{103}$Ru.—The chemistry of ruthenium has been studied extensively, especially since nuclear fission was discovered. Although a number of papers have been published on the structure of ruthenium compounds, the exact chemical structure of ruthenium is not known as yet because of the dynamic nature of its valency and solvation.

F. Kepak[1] found in his experiments that $^{103}$Ru is efficiently adsorbed on a column containing a mixture of alumina, ferric oxide and silver oxide. Our experiments show that the Ag-C column retains $^{103}$Ru very well. When a dilute sulfuric acid containing $^{103}$Ru tracer was passed through an Ag-C column, about 96% of the $^{103}$Ru tracer was adsorbed on the column. When the column was washed with water and dilute alkaline solution, the extraction of $^{103}$Ru was very small, 0.1–0.01%. These experiments indicate that ruthenium may form a stable compound with silver.

(3) Separation of $^{132}$Te.—$^{132}$Te often presents the most troublesome problem in the separation of a fission product because of its amphoteric nature. In the Ag-C system, a majority of $^{132}$Te passes through the column. A small portion (several percent) of $^{132}$Te retained on the column can break through the column upon washing with water or dilute base solution. The degree of the breakthrough is highly pH dependent.

$^{99}$Mo is adsorbed on the column until the pH reaches about 5 and then, exceeding pH 5, it starts to elute. However, the retention of $^{132}$Te on the column ranges from pH 5 to 9. Therefore, a small amount of $^{132}$Te may be detected in the $^{99}$Mo-alkaline eluate, depending on the chromatographic design.

The small amount of $^{132}$Te can be removed from $^{99}$Mo by column separation using a metal oxide. $^{132}$Te has a stronger affinity than $^{99}$Mo to a metal oxide such as

---

[1] Collection Czechoslov. Chem. Commun. 31, 3500 (1966).

alumina, zirconium oxide, etc. Therefore, the passing of the $^{99}$Mo-alkaline eluate through a metal oxide column eliminates the last trace of $^{132}$Te. Among the metal oxides, an alkaline-insoluble substrate such as zirconium oxide would be most applicable. In addition to removing $^{132}$Te, zirconium oxide in the sodium form eliminates any heavy metal ions at a pH over 7.

EXAMPLE 10

By procedures analogous to those described above, molybdenum was adsorbed on silver-coated activated carbon by passing the below-indicated solutions through a bed of the adsorbent 1 centimeter in diameter and 5 centimeters high. Each solution contained 2 milligrams of molybdenum with a $^{99}$Mo tracer. The first solution was 50 cubic centimeters of 1.8 N aqueous acetic acid and the second was 1.2 N oxalic acid. After each of these acidic solutions were passed through the column, the column was washed with 100 cubic centimeters of water. No molybdenum was detected in either of the effluents nor in either of the washings. Thus, the adsorption of Mo was about 100 percent in each case.

Other organic acids can be substituted for the two acids discussed above.

EXAMPLE 11

A column of silver coated activated carbon having molybdenum adsorbed thereon was eluted with 80 cubic centimeters of 5 volume percent aqueous morpholine. 85 percent of the adsorbed molybdenum was recovered in the eluant.

Other organic bases can be substituted for morpholine for use as the eluant.

What is claimed is:

1. Process for recovering high purity radioactive molybdenum which comprises contacting an acidic liquid containing dissolved molybdenum with an adsorbent comprising activated carbon having a coating of silver for a period of time sufficient to absorb molybdenum onto said adsorbent, and thereafter separating said liquid from said adsorbent.

2. The process of claim 1 wherein said molybdenum includes molybdenum-99, and wherein the acidic liquid is an aqueous acid having a pH below about 5.

3. The process of claim 2 wherein the acidic liquid is an aqueous mineral acid having a normality within the range of from about 0.001 to about 10.

4. The process of claim 2 wherein the acidic liquid is an aqueous mineral acid having a normality within the range of from about 0.1 to about 3.

5. The process of claim 2 wherein the aqueous mineral acid is sulfuric acid or a mixture of sulfuric acid and sulfurous acid.

6. The process of claim 2 wherein the adsorbent comprises activated carbon having a coating of silver, said silver being present in an amount within the range of from about 0.01 to about 2 weight percent, based on weight of carbon.

7. The process of claim 6 wherein said silver is present in an amount within the range of from about 0.1 to about 1.5 weight percent, based on weight of carbon.

8. The process of claim 2 wherein said adsorbent comprises a mixture of (a) activated carbon, and (b) activated carbon having a coating of silver.

9. The process of claim 8 wherein component (a) of the adsorbent is present in an amount of up to 70 weight percent, based on weight of adsorbent.

10. The process of claim 8 wherein component (a) of the adsorbent is present in an amount of from about 40 to about 60 weight percent, and component (b) of the adsorbent is present in an amount of from about 40 to about 60 weight percent, the percentages being based on the weight of the adsorbent.

11. Process of claim 2 wherein said acidic liquid is contacted with said adsorbent for a period of at least about one minute at a temperature within the range of from about 0° to about 100° C.

12. Process of claim 11 wherein the temperature is within the range of from about 5° to about 30° C.

13. Process which comprises the steps of:
(a) contacting an acidic liquid containing dissolved molybdenum with an adsorbent comprising activated carboin having a coating of silver for a period of time sufficient to adsorb molybdenum onto said adsorbent,
(b) thereafter separating said adsorbent from said acidic liquid, and
(c) thereafter contacting said adsorbent containing molybdenum with an alkaline liquid to desorb the molybdenum into said alkaline liquid.

14. Process of claim 13 wherein said molybdenum contains molybdenum-99, wherein said acidic liquid is an aqueous acid having a pH below about 5, and wherein said alkaline liquid is an aqueous base having a pH above about 8.

15. Process of claim 14 wherein the acidic liquid is an aqueous mineral acid having a normality of from about 0.001 to about 10, and wherein the alkaline liquid is an aqueous alkali metal hydroxide having a pH above about 8.

16. Process of claim 14 wherein the acidic liquid is an aqueous mineral acid having a normality of from about 0.1 to about 3, and wherein the alkaline liquid is an aqueous alkali metal hydroxide having a pH above about 8.

17. The process of claim 16 wherein the aqueous alkali metal hydroxide is sodium hydroxide having a normality of from about 0.1 to about 1.

18. Process of claim 14 wherein the aqueous acid is sulfuric acid or a mixture of sulfuric acid and sulfurous acid.

19. Process of claim 14 wherein the adsorbent comprises activated carbon having a coating of silver, the silver being present in an amount of from about 0.01 to about 2 weight percent, based on weight of carbon.

20. Process of claim 19 wherein the silver is present in an amount within the range of from about 0.1 to about 1.5 weight percent, based on weight of carbon.

21. Process of claim 14 wherein the adsorbent comprises a mixture of (a) activated carbon, and (b) activated carbon having a coating of silver.

22. Process of claim 14 wherein steps (a) and (c) are carried out at temperatures with the range of from about 0° to about 100° C.

23. Process of claim 14 wherein step (a) is carried out at a temperature with the range of from about 5° to about 30° C., and wherein step (c) is carried out at a temperature within the range of from about 20° to about 90° C.

24. Process for producing molybdenum-99 of medicinal purity which comprises the steps of:
(a) contacting an aqueous acid containing dissolved molybdenum-99 and having a pH below about 5 with an adsorbent comprising activated carbon having a coating of silver for a period of time sufficient to adsorb molybdenum-99 on said adsorbent;
(b) separating the adsorbent containing molybdenum-99 from said aqueous acid;
(c) thereafter contacting said adsorbent with an aqueous base having a pH above about 8 to desorb the molybdenum-99 into said base;
(d) acidifying said base containing molybdenum-99 to form an aqueous acid having a pH below about 5 containing dissolved molybdenum-99;
e) contacting the product of step (d) with an adsorbent comprising activated carbon having a coating of silver for a period of time sufficient to adsorb molybdenum-99 onto said adsorbent;

(f) thereafter separating the adsorbent from said liquid; and (g) contacting the adsorbent product of step (f) with an aqueous base having a pH above about 8 to desorb molybdenum-99 into said base.

References Cited

UNITED STATES PATENTS

| | | | |
|---|---|---|---|
| 3,307,938 | 3/1967 | Ronzio et al. | 23—15 X |
| 3,294,572 | 12/1966 | Piccione et al. | 117—47 |
| 3,288,570 | 11/1966 | Hendrickson | 23—15 X |
| 3,468,808 | 9/1969 | Arino | 252—301.1 |
| 3,450,639 | 6/1969 | Maria et al. | 252—301.1 |

OTHER REFERENCES

Hollis et al.: "Removal of Molybdenum from Acid Leach Liquors by Activated Carbon," N.S.A., vol. 13, No. 2, Abst. No. 973, p. 123, 1959.

CARL D. QUARFORTH, Primary Examiner

R. L. TATE, Assistant Examiner

U.S. Cl. X.R.

23—15 W; 252—447